United States Patent [19]
Huff, Jr. et al.

[11] Patent Number: 6,096,116
[45] Date of Patent: Aug. 1, 2000

[54] REDUCING IGNITION RISK FOR ACTIVATED CARBON

[75] Inventors: George A. Huff, Jr., Naperville; Om P. Mahajan, Wheaton, both of Ill.; Don M. Washecheck, Stoughton, Wis.; John A. Mahoney, Glen Ellyn; Howard Wong, Chicago, both of Ill.; Stanley W. Sorrels, Munster, Ind.

[73] Assignee: BP Amoco Corporation, Chicago, Ill.

[21] Appl. No.: 09/211,567

[22] Filed: Dec. 15, 1998

[51] Int. Cl.⁷ .................................................. B01D 53/04
[52] U.S. Cl. ............................... 95/126; 95/147; 96/108; 96/143; 55/519
[58] Field of Search .................. 95/37, 143–147, 95/900, 117–126; 96/108, 143, 146; 55/516, 518, 519, 524

[56] References Cited

U.S. PATENT DOCUMENTS

| | | | |
|---|---|---|---|
| 1,872,080 | 8/1932 | Harris | 95/144 |
| 4,239,508 | 12/1980 | Rock et al. | 95/147 |
| 5,493,035 | 2/1996 | Soltani-Ahmadi et al. | 549/542 |
| 5,814,132 | 9/1998 | Grime et al. | 95/143 X |

OTHER PUBLICATIONS

Article "Preventing Carbon Bed Combustion Problems" by A.A. Naujokas of *Loss Prevention* vol. 12, pp. 128–135, Published by *American Institute of Chemical Engineers* (1979).

Article "Assessment of Activated Carbon Stability toward Adsorbed Organics" by Edmond C. Akubuiro and Norman J. Wagner of *Ind. Eng. Chem. Res.* (1992), vol. 31, pp. 339–346, Published by *American Chemical Society*.

*Primary Examiner*—Robert H. Spitzer
*Attorney, Agent, or Firm*—Robert A. Yesukevich; Frank J. Sroka

[57] ABSTRACT

A sorbent material, an activated carbon canister and a method are described which can be utilized to remove organic compounds from a vaporous stream with a relatively greater degree of safety, as compared to previously known methods. In the invention, essentially dry and wetted activated carbon particles are intermixed in a substantially homogeneous mixture which inhibits accidental combustion. The heat capacity of wetted carbon particles retards the heating of nearby unwetted particles, so as to inhibit the ignition of the nearby unwetted particles. The presence of wetted particles intermixed in the substantially homogeneous mixture has relatively little effect on the hydrocarbon adsorption performance of the mixture.

17 Claims, 4 Drawing Sheets

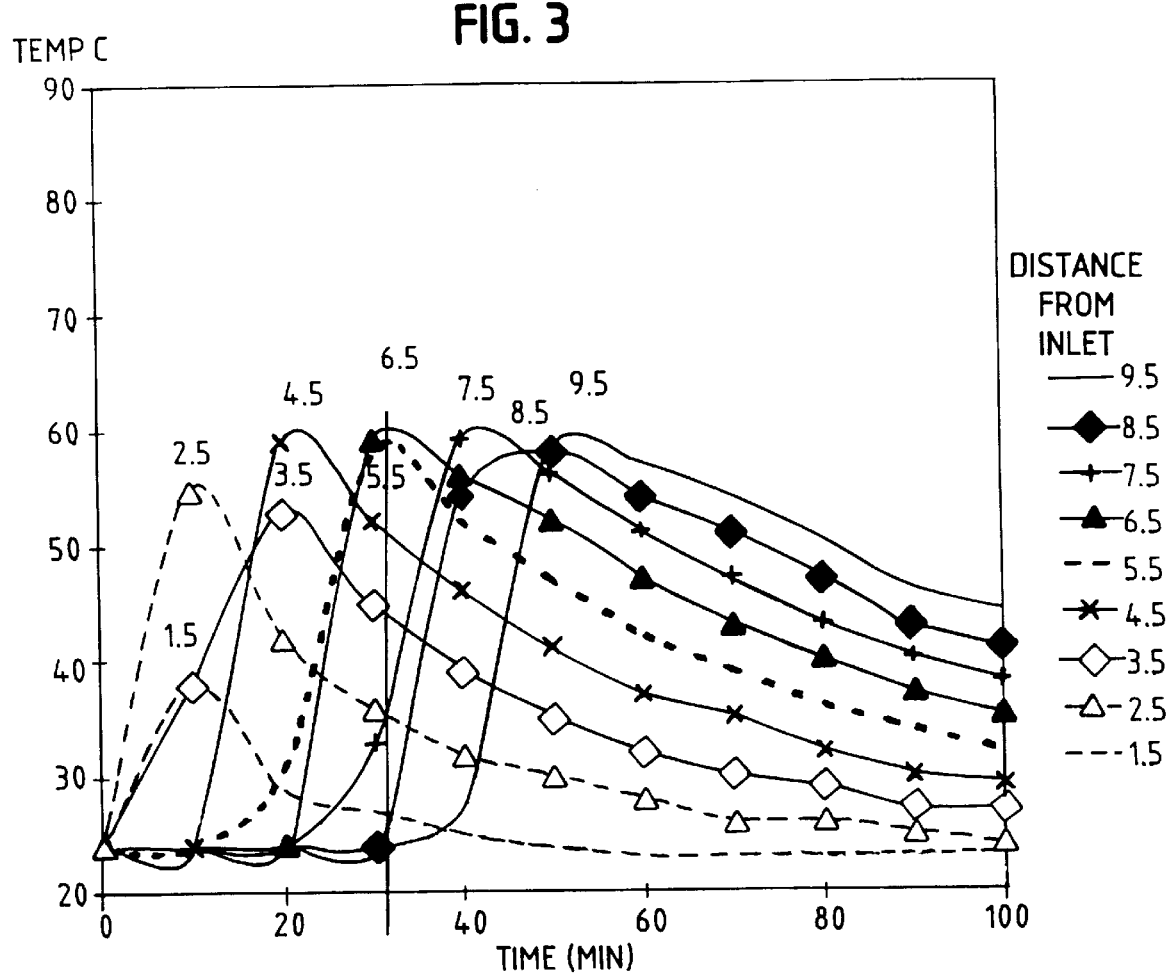

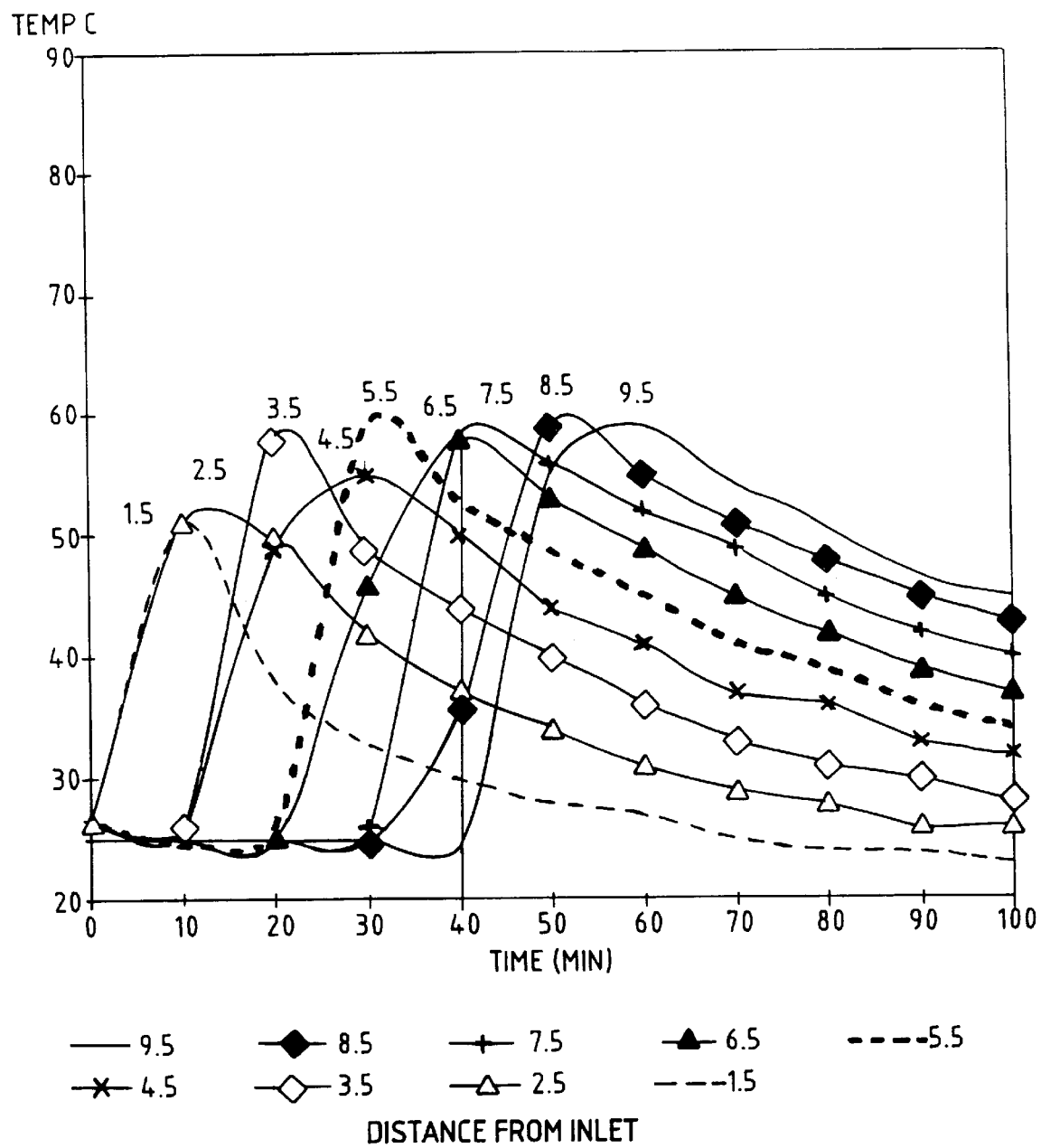

REDUCING IGNITION RISK FOR ACTIVATED CARBON

BACKGROUND OF THE INVENTION

1. Field of the Invention

The present invention relates to an adsorbent, a method and an activated carbon canister for removing organic compounds from a vaporous stream.

2. Background of the Invention

The use of activated carbon as an adsorbent is one of the most effective and economical methods of controlling emissions of volatile organic compounds such as, for example, benzene, toluene, ketone, gasoline and carbon tetrachloride. Volatile organic compounds are attracted to and held by the activated carbon. Activated carbon's effectiveness as an adsorbent is often attributed to the presence of a vast infrastructure of internal pores, which give rise to a desirably large surface area per unit mass of activated carbon.

Activated carbon is a microcrystalline, nongraphitic form of carbon which has been subjected to an activation process to develop internal porosity. Almost any carbonaceous material, including sawdust, nutshells, coal and petroleum residues, can be utilized as the source of carbon. The carbon can be chemically activated, as by contact with phosphoric acid, zinc chloride, potassium sulfide, potassium hydroxide or the like. Alternatively, the carbon can be activated by contact with, for example, heated air, steam or carbon dioxide.

Activated carbon employed in vapor-phase adsorption typically has a surface area of about 1000 to about 2000 square meters per gram. Most of this surface area is located in pores three nanometers or less in size. Activated carbon for vapor-phase adsorption is commonly composed of porous particles having an effective diameter of about one to about five millimeters. The particles may contain impurities such as moisture or ash.

Organic compounds have been successfully separated from vapor streams by exposure to activated carbon. For example, the petroleum and paint industries employ granular activated carbon to remove volatile organic compounds from process vents and sewer vents. However, if oxygen is present in such a vapor stream, for example, as a component of air in the vapor stream, accidental ignition of the organic compound or the activated carbon is a real danger. The problem of accidental ignition is exacerbated when adsorption of the organic compound on the activated carbon is accompanied by a significant release of heat energy, termed heat of adsorption.

Practitioners have long recognized the need to reduce the likelihood of accidental ignition in vapor phase activated carbon adsorption. For example, some practitioners have attempted to make activated carbon adsorption safer by diluting the vapor phase with a relatively inert ingredient, such as nitrogen or water. However, diluting the vapor phase is not a panacea because diluting the vapor phase tends to reduce adsorption efficiency. Additionally, while diluting the vapor phase may reduce the possibility of accidental ignition to some extent, it cannot entirely eliminate the possibility.

Other practitioners have attempted to make vapor phase activated carbon adsorption safer by wetting with water all or a portion of the activated carbon. However, wetting all of the activated carbon impairs the active carbon's capacity for adsorbing an organic carbon compound from the vapor phase. Moreover, as demonstrated below in Example 2, wetting only a portion of the activated carbon fails to reduce the risk of accidental ignition.

SUMMARY OF THE INVENTION

The invention provides a sorbent material, an activated carbon canister and a method which can be utilized to remove organic compounds from a vaporous stream with a relatively greater degree of safety, as compared to previously known methods. In the invention, essentially dry and wetted activated carbon particles are intermixed in a substantially homogeneous mixture which inhibits accidental combustion. The heat capacity of wetted carbon particles retards the heating of nearby dry particles, so as to inhibit the ignition of the nearby dry particles. The presence of wetted particles intermixed in the substantially homogeneous mixture has a minimal effect on the hydrocarbon adsorption performance of the mixture.

In one aspect, the invention is a method for separating a volatile organic compound from a vaporous mixture which includes the organic compound. The method includes passing an influent vaporous mixture which includes oxygen and an organic compound into an adsorption zone which is maintained at a temperature cooler than the ignition temperature of the vaporous mixture. The adsorption zone contains a sorbent material including essentially dry activated carbon particles and wetted activated carbon particles intermixed in a substantially homogeneous mixture. The dry activated carbon particles and the wetted activated carbon particles are present in a volumetric proportion of about 0.1 to about 10, respectively. Preferably, the wetted activated carbon particles are essentially saturated with water.

At least a portion of the organic compound is adsorbed on the dry particles. This adsorption serves to separate the organic compound from the vaporous mixture and produces an effluent vaporous mixture which is relatively depleted in the organic compound. The effluent vaporous mixture is discharged from the adsorption zone.

In another aspect, the invention is an activated carbon canister. The canister includes an elongated container having an inlet end which defines an inlet port, an outlet end which defines an outlet port, and a wall which is impervious to gas flow. The wall is disposed between and abuts the inlet end and the outlet end. A sorbent material is surrounded by the container. The sorbent material is composed of essentially dry activated carbon particles and wetted activated carbon particles intermixed in a substantially homogeneous mixture. Preferably, the wetted activated carbon particles are essentially saturated with water.

In another aspect, the invention is a method of treating activated carbon particles to produce a sorbent material. The method includes intermixing essentially dry activated carbon particles and wetted activated carbon particles. The sorbent material is composed of a substantially homogeneous mixture. Preferably, the wetted activated carbon particles are essentially saturated with water.

In still another aspect, the invention is a sorbent material composed of essentially dry activated carbon particles and wetted activated carbon particles intermixed in a substantially homogeneous mixture having a volumetric proportion of dry particles to wetted particles in the range of about 0.1 to about 10. Preferably, the wetted activated carbon particles are essentially saturated with water.

BRIEF DESCRIPTION OF THE DRAWINGS

FIG. 3 is a graph of temperature profiles in activated carbon having 25 weight percent water uniformly distributed, as a function of time and distance from the inlet of the activated carbon; and FIG. 4 is a graph of temperature profiles in activated carbon having 25 weight percent water in a substantially homogeneous mixture of essentially dry and wetted particles, as a function of time and distance from the inlet of the activated carbon.

DETAILED DESCRIPTION OF PREFERRED ASPECTS OF THE INVENTION

Figure 1:
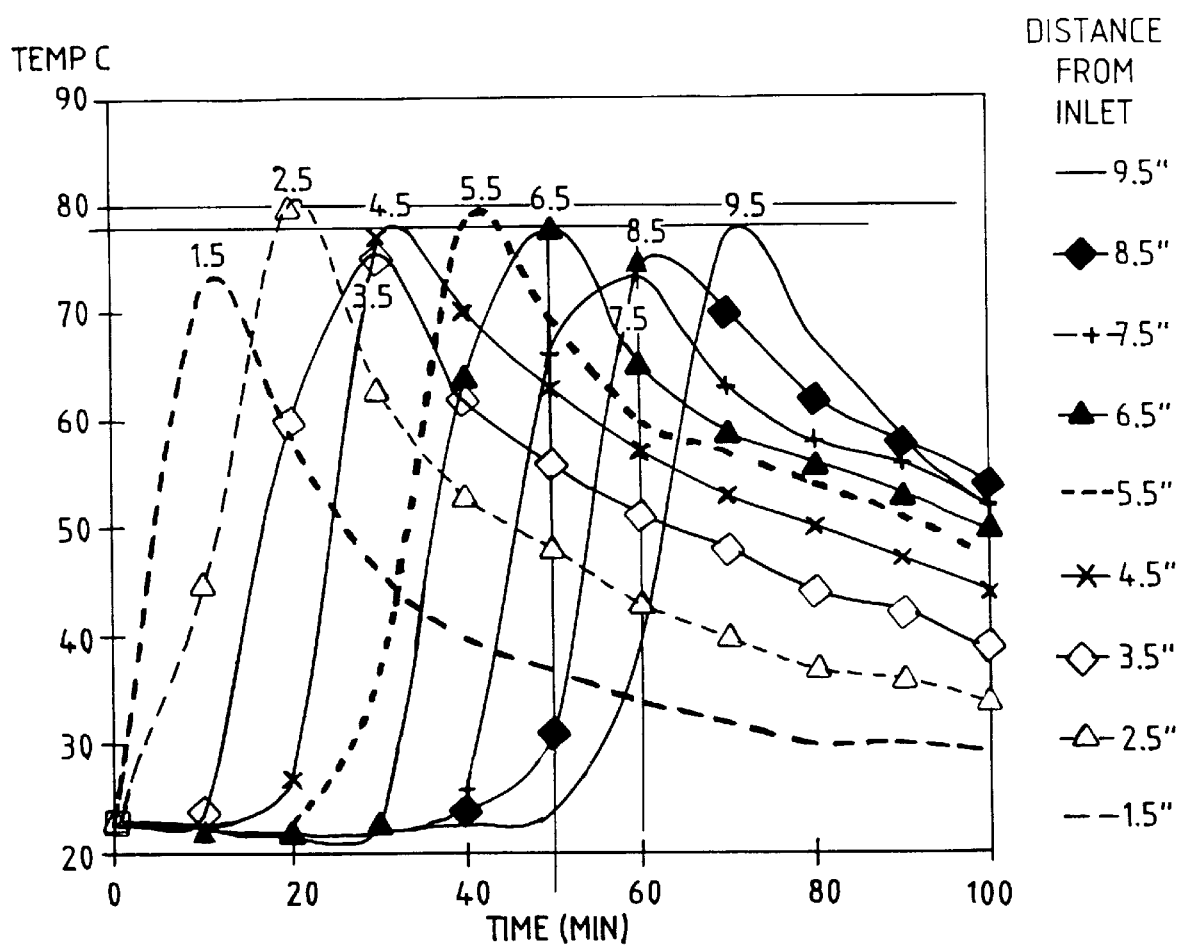
FIG. 1 is a graph of temperature profiles in dry activated carbon as a function of time and distance from the inlet of the activated carbon.

In a preferred aspect, the invention is a method for separating a volatile organic compound from a vaporous mixture which includes the organic compound. The organic compound may be, for example, an aromatic hydrocarbon such as benzene, toluene or gasoline. Alternatively, the organic compound may be a ketone such as diisobutyl ketone, ethyl butyl ketone or cyclohexanone; an aldehyde such as acetaldehyde, propionaldehyde or butyraldehyde; an organic acid such as propanoic acid, or butyric acid; an alcohol such methanol or ethanol; an amine such as monoethanol amine or diethanol amine; an ether such as methyl tertiary butyl ether or tertiary amyl methyl ether; tetrahydrofuran or carbon tetrachloride. Preferably, the organic compound is benzene.

The method includes passing an influent vaporous mixture which includes the organic compound and oxygen which may be, for example, a component of air included in the vapor mixture, into an adsorption zone. The adsorption zone is maintained at a temperature cooler than the ignition temperature of the vaporous mixture, as determined at adsorption zone conditions. The adsorption zone includes a sorbent material.

At least at the time when the sorbent material is initially exposed to the vaporous mixture, the sorbent material comprises essentially dry activated carbon particles. Practitioners will appreciate that the time of initial exposure to the vaporous material is crucial, because adsorption of the organic compound onto fresh activated carbon is likely to produce the greatest temperature increases in the sorbent material. It is contemplated that any water which may be present in the vaporous mixture or other activated carbon particles may over time become redistributed so that the activated carbon particles which were initially dry may eventually take on some amount of water. For the present purposes, "essentially dry" means that the amount of water which the essentially dry activated carbon may contain is insufficient to reduce the adsorption capacity of the essentially dry activated carbon particles for the organic compound by more than five percent, as compared at adsorption zone conditions to the capacity of otherwise identical dry activated carbon.

At least at the time when the sorbent material is initially exposed to the vaporous mixture, the sorbent material additionally comprises wetted activated carbon particles. Preferably, the wetted activated carbon particles are saturated with water. Wetted activated carbon particles can be prepared, for example, by immersing dry activated carbon particles and then draining by force of gravity liquid water from the particles. It is contemplated that the wetted activated particles may eventually give up all or a part of the water which they initially contained to for, example, adjacent activated carbon particles or the vaporous mixture.

The dry activated carbon particles and the wetted activated carbon particles are, at least at the time when the sorbent material is initially exposed to the vaporous mixture, intermixed in a substantially homogeneous mixture. For the present purposes, "substantially homogeneous" means that any volumes of relatively dry activated carbon particles which may exist in the substantially homogeneous mixture are insufficient in size and number to increase the overall adsorption capacity of the substantially homogeneous mixture for the organic compound by more than ten percent, as compared at adsorption zone conditions to the capacity of otherwise identical sorbent material including dry activated carbon particles and wetted activated carbon particles intermixed in a homogeneous mixture.

The dry activated carbon particles and the wetted activated carbon particles are, at least at the time when the sorbent material is initially exposed to the vaporous mixture, present in the substantially homogeneous mixture in a volumetric proportion of in the range of about 0.1 to about 10, respectively; more preferably, of about 0.3 to about 7; and most preferably, of about 1 to 1. Preferably, the sorbent material contains in the range of about 15 to about 25 pounds of water for each 100 pounds of carbon which is present in the sorbent material. More preferably, the sorbent material contains about 15 to about 25 pounds of water for each 100 pounds of carbon.

Preferably, essentially no liquid water is present in the interstices between activated carbon particles of the sorbent material. For the present purposes, "essentially no" means that any liquid water which may be present in the interstices is insufficient to increase the pressure drop across the sorbent material by more than five percent, as determined at adsorption zone conditions.

The method also comprises adsorbing at least a portion of the organic compound on the dry activated carbon particles, thereby separating the compound from the vaporous mixture and producing an effluent vaporous mixture which is discharged from the adsorption zone. The effluent vaporous mixture has a concentration of the organic compound which is relatively depleted, as compared to the concentration of the organic compound in the influent vaporous mixture.

Preferably, upon exposure to the influent vaporous mixture, the sorbent material exhibits a hydrocarbon adsorption performance which is greater than the hydrocarbon adsorption performance exhibited upon exposure to the influent vaporous mixture at identical conditions by an otherwise identical sorbent material containing the same total amount of water uniformly distributed among the activated carbon particles of the reference sorbent material. For the present purposes, "hydrocarbon adsorption performance" means the time required for the maximum temperature rise to travel a distance of 6.5 inches in the adsorbent at specified adsorption zone conditions, the distance being measured in the direction of flow defined by the passage of the vaporous mixture. "Relative hydrocarbon adsorption performance" means the ratio of hydrocarbon adsorption performances observed for two different sorbent materials, respectively, at the same adsorption zone conditions.

Preferably, upon exposure to the influent vaporous mixture, the sorbent material exhibits an exothermic temperature increase which is no more than about 110 percent, and most preferably no more than about 105 percent, of the exothermic temperature increase exhibited upon exposure to the influent vaporous mixture at identical conditions by an otherwise identical sorbent material containing the same total amount of water uniformly distributed among the activated carbon particles of the reference sorbent material. "Exothermic temperature increase" means the arithmetic difference calculated as a peak temperature for a given time minus the temperature of the vaporous mixture at the inlet of the sorbent material at the same time.

It is preferred that the sorbent material is subsequently regenerated for reuse or disposal as, for example, by heating so as to desorb water and the organic compound.

In another preferred aspect, the invention is an activated carbon canister. The canister includes an elongated container having an inlet end which defines an inlet port, an outlet end which defines an outlet port, and a wall. The wall is impervious to gas flow, and is disposed between and abuts the inlet end and the outlet end. The container may be, for example, a drum having an internal volume of about 50 to about 100 cubic feet. More preferably, the container is a steel drum having an internal volume of about 65 cubic feet.

A sorbent material in accordance with the present invention is placed in the container, so that the sorbent material is surrounded by the container. The sorbent material, which is composed of essentially dry activated carbon particles and wetted activated carbon particles intermixed in a substantially homogeneous mixture, is described above. Preferably, the activated carbon is composed of particles which are surface-oxidized.

In yet another preferred aspect, the invention is a sorbent material which includes essentially dry activated carbon particles and wetted activated carbon particles intermixed in a substantially homogeneous mixture, and is described above. Preferably, the sorbent material exhibits upon exposure to a flammable organic compound in vaporous form a relatively reduced exothermic temperature increase, as compared to the exothermic temperature increase which is exhibited upon exposure to the organic compound at identical conditions by an otherwise identical reference sorbent material containing the same total amount of water distributed among the saturated activated carbon particles at the inlet of the reference sorbent material. Preferably, the wetted particles of the sorbent material are saturated with water.

In still another preferred aspect, the invention is a method of treating activated carbon particles to produce a sorbent material. The method includes intermixing essentially dry activated carbon particles and wetted activated carbon particles, to produce a substantially homogeneous mixture having a volumetric proportion of dry particles to wetted particles in the range of about 0.1 to about 10. The sorbent material is described above.

The following Examples are presented in order to better communicate the invention.

Demonstration Procedure

The following experimental procedure is substantially similar to the procedures described in Examples 1 through 4, which are set forth in detail below. An internal volume of ten lineal inches of Plexiglas™ tubing, the tubing having a nominal inside diameter of two inches, is charged with commercially obtained activated charcoal in particulate form to simulate an activated charcoal canister. The amount of activated carbon in the tubing is determined by weight. The same amount and source of activated carbon, and the same gasoline, are employed in each of the Examples set forth below. The activated carbon is fresh "as received" from a commercial supplier except, perhaps, for being subjected to certain wetting procedures which are explicitly described below in each instance.

A nitrogen gas flow of 0.5 to 1.0 standard cubic feet per second is initiated through a tank containing gasoline and through a tank of water, both of the tanks being maintained at one atmosphere and about 20 degrees C. The tanks are sufficiently large so as to substantially saturate the gas flow with gasoline and water vapor, with essentially no carry over of liquid droplets from the tanks. The resulting vapor mixture is directed through the activated carbon in the tubing at about 20 degrees C. in a predetermined and unvarying direction. Temperatures are measured by thermocouple along the central axis of the activated carbon at one inch intervals.

EXAMPLE 1

Temperature Profile of "As received" Activated Carbon

Run 1 is a control procedure which demonstrates the temperature profile of commercially available activated carbon, in "as received condition," upon exposure to a humid, gasoline saturated stream of nitrogen gas, substantially in accordance with the Demonstration Procedure, set forth above. The activated carbon of Run 1 is not subjected to any wetting procedures prior to initiation of gas flow. As a basis for relative hydrocarbon adsorptive performance comparisons, the time required for the maximum temperature rise to travel to the 6.5 inch point in the "As received" activated carbon is measured as 50 minutes and noted.

FIG. 1 shows the temperature profile in the dry activated carbon as a function of time and distance from the inlet of the activated carbon. Referring to FIG. 1, it can be seen that the temperature at 1.5 inches from the inlet rises rapidly to a peak which is within about 5 degrees C. of the maximum temperature rise. The maximum temperature rise is 57 degrees C., which appears at 2.5 inches distance from inlet, remains relatively constant through the activated carbon, and travels lengthwise through the activated carbon of Run 1 at a fairly uniform temperature travel rate of 0.13 inches per minute.

EXAMPLE 2

Temperature Profile of Activated Carbon having 25 wt. % Water at Inlet

Run 2 demonstrates a previously known procedure in which liquid water is introduced to the inlet of commercially available activated carbon, in "as-received condition," before gas flow is initiated. The procedure is carried out in Run 2 is substantially similar to the Demonstration Procedure, as set forth above. More specifically, 25 grams of water for each 100 grams of activated carbon is added to the inlet of the activated carbon before gas flow is initiated. This amount of water is believed to completely fill the pores of the activated carbon in the upstream one-half of the activated carbon.

Figure 2:
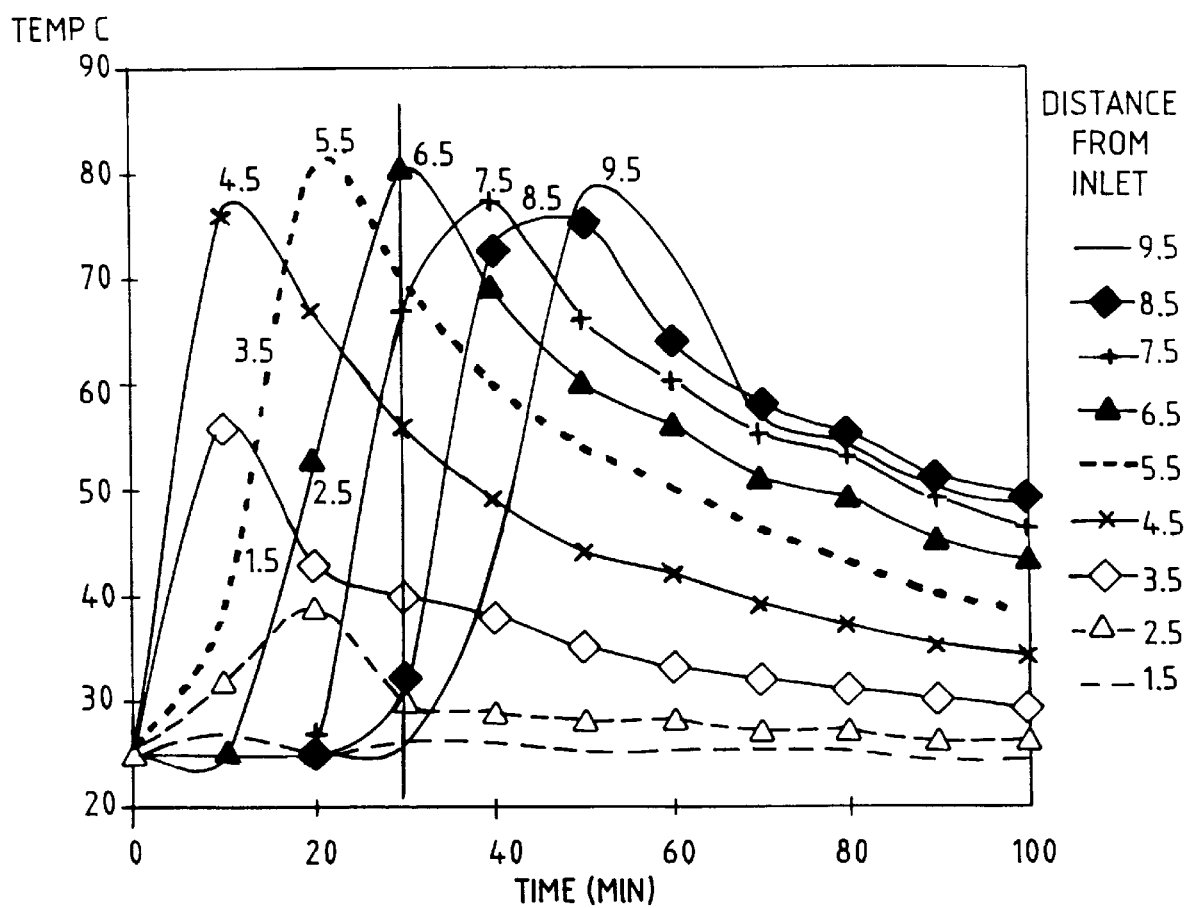
FIG. 2 is a graph of temperature profiles in activated carbon having 25 weight percent water at inlet, as a function of time and distance from the inlet of the activated carbon.

FIG. 2 depicts the temperature profile which is observed in the activated carbon having 25 weight percent water at inlet as a function of time and distance from the inlet of the activated carbon. The time required for the maximum temperature rise to travel to the 6.5 inch point in Run 2 is measured and found to be 30 minutes, which is 60 percent of the time required for the maximum temperature rise to travel to the 6.5 inch point in the activated carbon of Example 1, above. Therefore, the relative hydrocarbon adsorption performance for Run 2 is calculated to be reduced by 40 percent, as compared to the "as received" activated carbon.

Inspection of FIG. 2 reveals that the upstream one-half of the activated carbon performs differently than does the downstream one-half of the activated carbon. The temperature increases depicted in FIG. 2 are less than those which are apparent in FIG. 1. The temperatures of FIG. 2 increase relatively slowly with distance from the inlet, and reach a maximum of 58 degrees C. at a distance of 5.5 inches from the inlet. Additionally, the maximum temperature rise proceeds through the activated carbon of Run 2 at a temperature travel rate of 0.38 inches per minute, which is considerably faster than the activated carbon temperature travel rate of 0.13 in Example 1, above.

In contrast, in the downstream one-half, maximum observed temperature generally decreases with distance from the inlet. The peak temperature rise for the downstream-half of the activated carbon of Run 2 is 56 degrees C. and occurs at a distance of 6.5 inches from the inlet. This temperature rise is similar to the temperature rise for the activated carbon of Example 1, which is 57 degrees C. Moreover, the temperature travel rate through the downstream half of the activated carbon for Run 2 is 0.13 inches per minute, which is identical to the temperature travel rate through the activated carbon in Example 1, above.

The data for the two halves of the activated carbon bed of Run 2, indicate that hydrocarbons simply skip over a wetted portion of the activated carbon, so that the wetted portion affords little or no protection for adjacent dry portions. Water addition to a portion of the activated carbon desirably increases the heat capacity of the wetted activated carbon, as compared to that of the "as received" activated carbon, so as to relatively reduce the risk of overheating on the wetted activated carbon. However, it appears that water is too strongly adsorbed on the activated carbon to be displaced by the incoming hydrocarbons. The water apparently remains in place, while the hydrocarbons continue on to adjacent unwetted portions of the activated carbon. Because the maximum temperature rise of adjacent unwetted portions of the activated carbon is substantially unchanged, water added to a portion of the bed does not reduce effectively the overall risk of overheating and accidental ignition.

EXAMPLE 3

Temperature Profile of Activated Carbon having 25 wt. % Water Uniformly Dispersed Run 3 reports a previously known procedure in which liquid water is uniformly dispersed throughout the activated carbon, so that all particles of activated carbon present have essentially the same moisture level, before gas flow is initiated. The procedure of Run 3 is substantially similar to the Demonstration Procedure, as set forth above. In Run 3, 25 grams of water for each 100 grams of activated carbon is substantially uniformly dispersed throughout the activated carbon. FIG. 3 depicts the temperature profile which is observed in the activated carbon having 25 weight percent water dispersed throughout as a function of time and distance from the inlet of the activated carbon.

Referring now to FIG. 3, the maximum temperature rise for Run 3 is 35 degrees C. which is less than the temperature rises of Examples 1 and 2, above. The temperature travel rate is relatively constant at 0.19 to 0.20 inches per minute. The time required for the maximum temperature rise to travel to the 6.5 inch point in Run 3 is measured and found to be 30 minutes, which is 60 percent of the time required for the maximum temperature rise to travel to the 6.5 inch point in the activated carbon of Example 1, above. Therefore, the relative hydrocarbon adsorption performance for Run 3 is calculated to be reduced by 40 percent, as compared to the activated carbon of Example 1.

The data of Run 3 indicates that uniformly dispersing a given amount of water throughout activated carbon provides relatively safer hydrocarbon adsorption operation than adding the same amount of water to a portion of the activated carbon. However, the objectionable reduction in hydrocarbon adsorption performance is about the same for both techniques.

EXAMPLE 4

Temperature Profile of Activated Carbon having 25 wt. % Water in a substantially Homogeneous Mixture Run 4 demonstrates a procedure of the present invention. Activated carbon having 25 weight percent water in a substantially homogeneous mixture, based on the weight of activated carbon, is prepared by intermixing water saturated activated carbon particles with commercially available activated carbon particles in "as received" condition. A procedure is carried out which is substantially similar to the Demonstration Procedure, as set forth above. The temperature profile for Run 4 as a function of time and distance from the inlet are presented in FIG. 4.

A maximum temperature rise of 34 degrees C. is observed, which is comparable to the temperature rise of 35 degrees C. in Example 3, above, for activated carbon having 25 weight percent water essentially uniformly dispersed. A rate of temperature rise travel of 0.16 inches per minute is noted, which travel rate is lower than the rate of temperature travel for Example 3. Additionally, the time required for the maximum temperature rise to travel to the 6.5 inch point in Run 4 is measured and found to be 80 percent of the time required for the maximum temperature rise to travel to the 6.5 inch point in the activated carbon of Example 1, above. Therefore, the relative hydrocarbon adsorption performance for Run 4 is calculated to be reduced by 20 percent, as compared to the activated carbon of Example 1.

The data of Examples 1 through 4 are shown in Table I, below. Inspection of Table I indicates that the invention demonstrated in Run 4 provides unexpected advantages in temperature rise suppression, temperature travel rate reduction and hydrocarbon adsorption performance.

TABLE I

SUMMARY OF EXPERIMENTAL RESULTS

| Run No. | Water Addition | Maximum Temperature Rise (° C.) | Time to Reach 6.5 inches from Inlet (min.) | Relative Capacity |
| --- | --- | --- | --- | --- |
| 1 | Unwetted Base Case | 57 | 50 | 100% |
| 2 | 25 lb/Water/100 lb Carbon at Bed Inlet | 55 | 30 | 60% |
| 3 | 25 lb Water/100 lb Carbon Uniformly Distributed Over Bed | 35 | 30 | 60% |
| 4 | 25 lb Water/100 lb Carbon in Mixed Aliquots of Water-Saturated Carbon with Unwetted Carbon | 34 | 40 | 80% |

Although Examples and hypotheses have been set forth above in order better communicate the invention, they are not intended to limit the scope of the invention or the appended claims.

We claim as our invention:

1. A method for separating a volatile organic compound from a vaporous mixture which includes the organic compound, which method comprises:

passing an influent vaporous mixture which includes oxygen and an organic compound, the vaporous mixture having a determinable ignition temperature, into an adsorption zone which is maintained at a temperature cooler than the ignition temperature, and includes a sorbent material comprising essentially dry activated carbon particles and wetted activated carbon particles intermixed in a substantially homogeneous mixture having a volumetric proportion of dry particles to wetted particles in the range of about 0.1 to about 10;

adsorbing at least a portion of the organic compound on the dry particles, thereby separating the organic compound from the vaporous mixture; and discharging from the adsorption zone an effluent vaporous mixture having a concentration of the organic compound which is relatively depleted, as compared to the concentration of the organic compound in the influent vaporous mixture.

2. The method of claim 1 which further comprises heating the sorbent material to desorb water and the organic compound.

3. The method of claim 1 in which the organic compound is an aromatic hydrocarbon.

4. The method of claim 3 in which the aromatic hydrocarbon is benzene.

5. The method of claim 1 in which the sorbent material exhibits upon exposure to the influent mixture a hydrocarbon adsorption performance which is greater than the hydrocarbon adsorption performance exhibited upon exposure to the influent vaporous mixture at identical conditions by an otherwise identical sorbent material containing the same total amount of water uniformly distributed among the activated carbon particles of the otherwise identical sorbent material.

6. The method of claim 1 in which the sorbent material exhibits upon exposure to the influent mixture an exothermic temperature increase which is no more than about 110 percent of the exothermic temperature increase exhibited upon exposure to the influent vaporous mixture at identical conditions by an otherwise identical sorbent material containing the same total amount of water uniformly distributed among the activated carbon particles of the otherwise identical sorbent material.

7. An activated carbon canister, comprising:

an elongated container having an inlet end which defines an inlet port, an outlet end which defines an outlet port, and a wall which is impervious to gas flow, the wall being disposed between and abutting the inlet end and the outlet end;

a sorbent material which is surrounded by the container and comprises essentially dry activated carbon particles and wetted activated carbon particles intermixed in a substantially homogeneous mixture having a volumetric proportion of dry particles to wetted particles in the range of about 0.1 to about 10.

8. The canister of claim 7 in which the volumetric proportion is about one to one, respectively.

9. The canister of claim 7 in which the wetted particles are saturated with water.

10. The canister of claim 7 in which essentially no liquid water is present in the interstices between the activated carbon particles.

11. The canister of claim 7 in which the activated carbon particles are surface-oxidized.

12. A sorbent material, which comprises:

essentially dry activated carbon particles and wetted activated carbon particles intermixed in a substantially homogeneous mixture having a volumetric proportion of dry particles to wetted particles in the range of about 0.1 to about 10.

13. The sorbent material of claim 12 which exhibits upon exposure to a flammable organic compound in vaporous form a relatively reduced exothermic temperature increase, as compared to the exothermic temperature increase which is exhibited upon exposure to the organic compound at identical conditions by an otherwise identical reference sorbent material containing the same total amount of water distributed among the saturated activated carbon particles at the inlet of the otherwise identical sorbent material.

14. The sorbent material of claim 12 which contains in the range of about 15 to about 25 pounds of water for each 100 pounds of carbon which is present in the sorbent material.

15. The sorbent material of claim 12 in which the volumetric proportion is about one to one, respectively.

16. The sorbent material of claim 12 in which the wetted particles are essentially saturated with water.

17. A method of treating activated carbon particles to produce a sorbent material, the method comprising:

intermixing essentially dry activated carbon particles and wetted activated carbon particles, to produce a sorbent material composed of a substantially homogeneous mixture having a volumetric proportion of dry particles to wetted particles in the range of about 0.1 to about 10.

* * * * *

UNITED STATES PATENT AND TRADEMARK OFFICE
CERTIFICATE OF CORRECTION

Page 1 of 2

PATENT NO.: 6,096,116
DATED: August 1, 2000
INVENTOR(S): George A. Huff, Jr., Om P. Mahajan, Don M. Washecheck, John A. Mahoney, Howard Wong, Stanley W. Sorrels It is certified that error appears in the above-identified patent and that said Letters Patent is hereby corrected as shown below:

| Col. | Line | | |
|------|------|---|---|
| 3 | 22 | "such methanol or ethanol;" | |
| | | should read: "such as methanol or ethanol;" | |
| 3 | 64 | "contained to for, example," | |
| | | should read: "contained to, for example," | |
| 6 | 45 | "procedure is carried out in" | |
| | | should read: "procedure carried out in" | |

UNITED STATES PATENT AND TRADEMARK OFFICE
CERTIFICATE OF CORRECTION

PATENT NO. : 6,096,116
DATED : August 1, 2000
INVENTOR(S) : George A. Huff, Jr., Om P. Mahajan, Don M. Washecheck, John A. Mahoney, Howard Wong, Stanley W. Sorrels It is certified that error appears in the above-identified patent and that said Letters Patent is hereby corrected as shown below:

| Col. | Line | |
|---|---|---|
| 8 | 39 | "temperature travel rate"<br><br>should read:<br>"temperature rise travel rate" |

Signed and Sealed this

Seventeenth Day of April, 2001

Attest:

NICHOLAS P. GODICI

Attesting Officer    Acting Director of the United States Patent and Trademark Office